US010970775B1

(12) United States Patent
Parihar et al.

(10) Patent No.: US 10,970,775 B1
(45) Date of Patent: Apr. 6, 2021

(54) SYSTEM, MANUFACTURE, AND METHOD FOR AUTO LISTING CREATION FOR MARKETPLACES

(71) Applicant: Amazon Technologies, Inc., Seattle, WA (US)

(72) Inventors: Sunil Singh Parihar, Renton, WA (US); Huy Quang Dang, Seattle, WA (US); Janani Sowprnika Arvind, Redmond, WA (US); Joe Jony Jeyaratnam, Toronto (CA); Surya Kumar Senapati, Seattle, WA (US); Sarvesh Ganapati Pai, Mercer Island, WA (US); Sai Kishore Pavuluri, Redmond, WA (US); Edgardo Veloz Arroyo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 603 days.

(21) Appl. No.: 15/728,256

(22) Filed: Oct. 9, 2017

Related U.S. Application Data

(62) Division of application No. 14/222,528, filed on Mar. 21, 2014, now Pat. No. 9,805,411.

(51) Int. Cl.
*G06Q 30/00* (2012.01)
*G06Q 30/06* (2012.01)

(52) U.S. Cl.
CPC ......... *G06Q 30/0641* (2013.01); *G06Q 30/06* (2013.01); *G06Q 30/0601* (2013.01);
(Continued)

(58) Field of Classification Search
CPC ................. G06Q 30/0601–0645; G06Q 30/08
(Continued)

(56) References Cited

U.S. PATENT DOCUMENTS 7,110,967 B1 9/2006 Maas et al.
2008/0172329 A1 7/2008 Kaufman et al.
(Continued)

OTHER PUBLICATIONS

DeFrank, Gina, "Amazon Eases Cross-Border Trade for EU Sellers", Feb. 24, 2014, ChannelAdvisor.com, accessed at [https://www.channeladvisor.com/blog/marketplaces/amazon-eases-cross-border-trade-for-eu-sellers/] on Dec. 3, 2020 (Year: 2014).*

(Continued)

*Primary Examiner* — Jeffrey A. Smith
*Assistant Examiner* — Lindsey B Smith
(74) *Attorney, Agent, or Firm* — Kilpatrick Townsend & Stockton LLP

(57) ABSTRACT

Systems and methods for recommending and implementing network documents for users to offer items in a marketplace may be provided. A system can obtain user data that includes an item offered by a user in a first electronic marketplace. For example, the system can identify and catalog items offered by a particular user. The system can identify a second electronic marketplace for the user to offer the item. The system can determine implementation information for the second electronic marketplace. The system can generate a network document for the at least one item that is configured to be presented in the second electronic marketplace based at least in part on the implementation information.

17 Claims, 10 Drawing Sheets

(52) U.S. Cl.
CPC ..... *G06Q 30/0603* (2013.01); *G06Q 30/0607* (2013.01); *G06Q 30/0611* (2013.01); *G06Q 30/0613* (2013.01); *G06Q 30/0619* (2013.01); *G06Q 30/0623* (2013.01); *G06Q 30/0631* (2013.01)

(58) Field of Classification Search
USPC .............................................. 705/26.1–27.2
See application file for complete search history.

(56) References Cited

U.S. PATENT DOCUMENTS

| | | |
|---|---|---|
| 2013/0006808 A1 | 1/2013 | Kassaei et al. |
| 2013/0006815 A1* | 1/2013 | Kassaei .................. G06Q 30/06 705/27.1 |
| 2013/0036029 A1 | 2/2013 | Patt et al. |
| 2013/0046651 A1* | 2/2013 | Edson ................ G06Q 30/0255 705/26.4 |
| 2013/0073336 A1* | 3/2013 | Heath .................... G06Q 30/02 705/7.29 |
| 2014/0195931 A1 | 7/2014 | Kwon et al. |

OTHER PUBLICATIONS

U.S. Appl. No. 14/222,528, "Advisory Action", dated Nov. 30, 2017, 22 pages.
U.S. Appl. No. 14/222,528, "Advisory Action", dated Mar. 20, 2017, 7 pages.
U.S. Appl. No. 14/222,528, "Final Office Action", dated Nov. 30, 2016, 22 pages.
U.S. Appl. No. 14/222,528, "Final Office Action", dated Jan. 29, 2016, 28 pages.
U.S. Appl. No. 14/222,528, "Non-Final Office Action", dated Sep. 14, 2015, 16 pages.
U.S. Appl. No. 14/222,528, "Non-Final Office Action", dated Jul. 5, 2016, 19 pages.
U.S. Appl. No. 14/222,528, "Notice of Allowance", dated Jul. 7, 2017, 13 pages.
Capela, "Dictionary Of International Business Terms", Hauppauge, NY: Barron's Educational Series.eBook Collection, 2000.

* cited by examiner

SYSTEM, MANUFACTURE, AND METHOD FOR AUTO LISTING CREATION FOR MARKETPLACES

CROSS REFERENCE TO RELATED APPLICATIONS

This application is a Division of U.S. patent application Ser. No. 14/222,528, filed Mar. 21, 2014, entitled "AUTO LISTING CREATION FOR MARKETPLACES," the content of which is herein incorporated by reference in its entirety.

BACKGROUND

Businesses and entrepreneurial minded people are typically seeking ways to display their products or services to new customers in order to garner more revenue and goodwill. Current network technology allows for these entities to reach a customer base beyond their brick and mortar store by offering, for example, items for sale via public networks (e.g., the Internet). However, despite the many advantages that selling products online has granted to business entities, there exist some implementation concerns. With the ever expanding reach of the Internet, it can be difficult for business entities to obtain or even process the information required to reach new customer bases that are made available by network technology. A lack of knowledge about emerging markets and various barriers to entering a market once identified can result in businesses refraining from attempting to reach a new customer base. Business that are unable or choose not reach new customer bases not only miss opportunities to grow their business through new revenue sources but can deprive customers from the benefits of access to different vendors.

BRIEF DESCRIPTION OF THE DRAWINGS

Various embodiments in accordance with the present disclosure will be described with reference to the drawings, in which.

DETAILED DESCRIPTION

Figure 1:
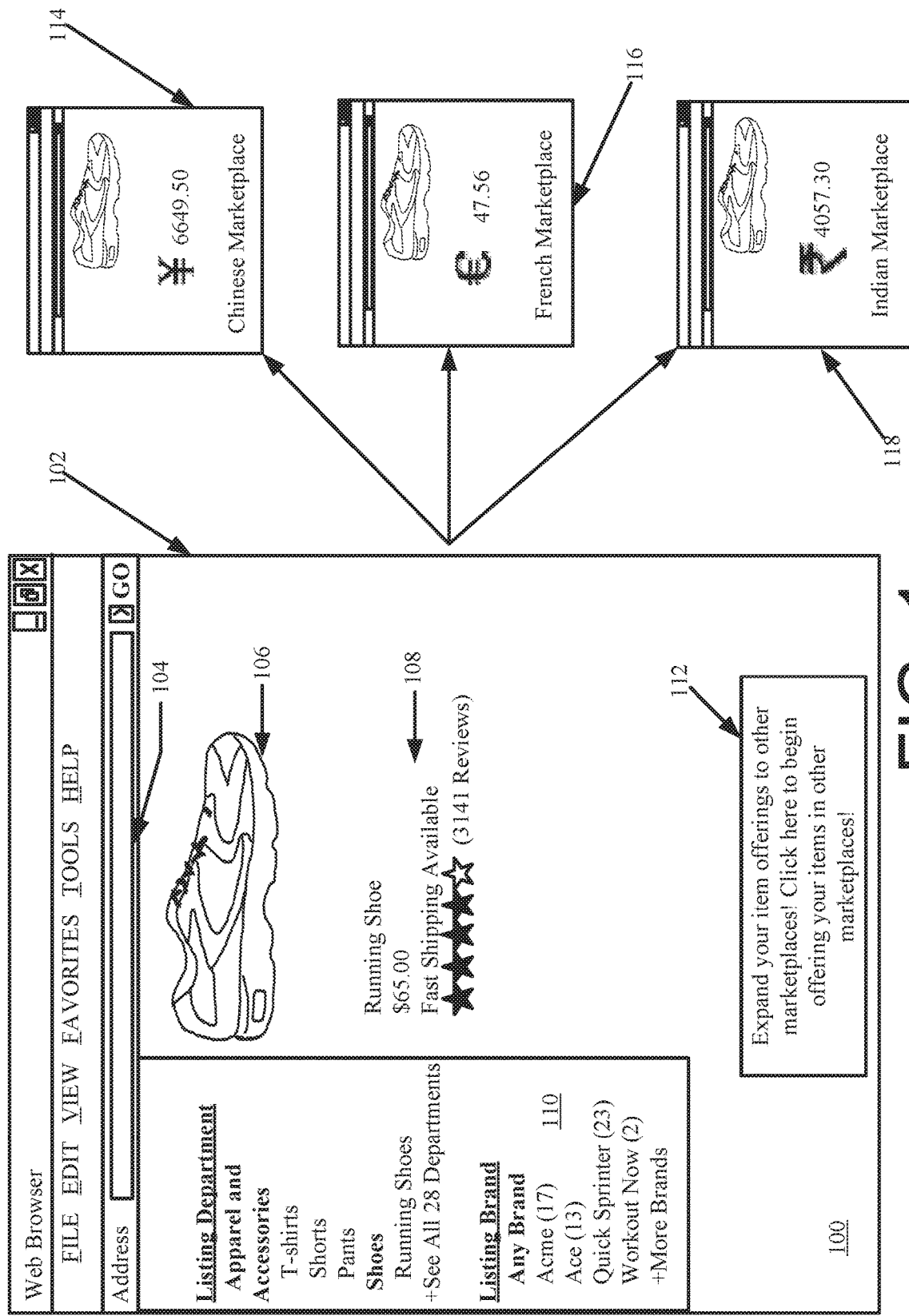
FIG. 1 illustrates an example network document for an item offered by a user in an electronic marketplace and several implementations of the same item offered in other electronic marketplaces on behalf of the user as described herein, according to an example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. All examples described in the present disclosure are non-limiting examples. Furthermore, well-known features may be omitted or simplified in order not to obscure the embodiment being described.

Embodiments of the present disclosure are directed to, among other things, a system for providing recommendations and implementations for a user that offers items in an electronic marketplace. In particular, the system can obtain or receive user data from a user in an electronic marketplace, identify and recommend other electronic marketplaces for the user to offer items in, and implement network documents (e.g., a web pages or other electronic documents available over a network) which would allow for the user to offer items in the other identified electronic marketplaces. For example, the system may detect that a user is offering a particular item only in one market or electronic marketplace currently and, based at least in part on this offered item information, identify another electronic marketplace for the user to offer the particular item. Additionally, the user may submit items they wish to offer in additional marketplaces and the system can identify potential marketplaces and implement network documents which would allow the user to offer their items in the identified potential marketplaces. In accordance with at least one embodiment, a service may identify electronic marketplaces that a user may offer their items in and based on an algorithm determine implementation information necessary to allow the user to offer the items in the identified marketplaces.

As used herein, the phrase "implementation information" includes information that may be utilized to offer items in a marketplace such as: export/import requirements, tax information, compliance information, language translation information, market prices, comparable prices for similar items, and shipping requirements for identified geographic locations. Upon identifying a marketplace and determining implementation information for the marketplace, the service may generate a network document configured to be presented in the identified marketplace for an item offered by a user. In accordance with at least one embodiment, the service may notify the user that such a network document exists and may give them the option to start offering items in one or more identified marketplaces. The marketplaces may be identified utilizing the network documents generated by the service based at least in part on the implementation information. In accordance with at least one embodiment, the service may identify policies associated with the identified marketplace for an item offered by the user. In an example, the service may utilize the policies and the implementation information to generate a network document for the item offered by the user that is configured to be presented in the identified marketplace.

In a non-limiting example, the service may obtain or receive data about items offered by a user in a first electronic marketplace. For example, the service may receive user data that indicates that the user is currently offering battery adaptors for laptops in the first electronic marketplace. The service may identify a second electronic marketplace, such as a Chinese electronic marketplace, where the user may wish and/or be able to offer their battery adaptors. The service may determine, based on the user data and item data associated with the battery adaptor, implementation information for the second electronic marketplace, such as translation information, compliance information, and/or item price. For example, the service may first determine whether the battery adaptors will comply with local standards or regulations in China. The service may generate a network document or web page that is configured to be presented in the second electronic marketplace based on the implementation information. The network document may be an item detail page for the battery adaptor that incorporates the implementation information. In the current example, the item detail page may be translated into a Chinese dialect, and have a recommended price for the second electronic price. The service may then notify the user that the network document is generated. For example, the service may send an email that includes a report of the identified marketplaces, potential profit to be made in offering their items in the identified marketplaces, and information informing the user that network documents have already been generated for implementing the offering of items in the identified marketplaces. In accordance with at least one embodiment, upon receiving user input, such as a user opting in to offer their items in the second electronic marketplace via a one click button presented in a user interface, the service may implement or otherwise provide the network document on behalf the user in the second electronic marketplace.

In accordance with at least one embodiment, the service may receive user data, from the user, including items currently offered by the user in an electronic marketplace associated with the service, or items the user wishes to offer in another electronic marketplace. The service may identify other electronic marketplaces based on the received user data in which the user can offer their items. In accordance with at least one embodiment, the service may obtain user data including items currently offered by the user from an electronic marketplace associated with the service. In accordance with at least one embodiment, the service may utilize a machine learning algorithm to determine implementation information necessary for generating a network document in other electronic marketplaces. Examples of machine learning algorithms can include supervised learning algorithms, unsupervised learning algorithms, or any suitable machine learning algorithm. In accordance with at least one embodiment, the service may determine the implementation information based on a machine learning algorithm utilizing user data and/or item data associated with an item offered by the user. In accordance with at least one embodiment, the machine learning algorithm can also utilize whether a user has opted to utilize the marketplace recommendation and implementation service as a data point for future implementation information determinations. In accordance with at least one embodiment, the service may utilize user profiles to identify other electronic marketplaces and determine implementation information. In accordance with at least one embodiment, a user profile can include information about which items the user currently offers, the item categories corresponding to the items offered, the user's sales history, the destination of items offered and sold by the user, calendar times when the user appears to be most active in terms of offering and fulfilling orders, user revenue, a user's rate of expansion, a user's product portfolio, and user ratings from consumers who have purchased offered items from the user.

In accordance with at least one embodiment, the service may identify a policy associated with another electronic marketplace. The service may maintain a set of policies for items offered by a user for use in offering the items in another electronic marketplace. For example, the service may maintain a policy that does not allow the generation of network documents for an item that is currently selling for a loss in another electronic marketplace. In accordance with at least one embodiment, the set of policies or the policy may be updated by the service or by user input. In accordance with at least one embodiment, the service may generate one or more network documents that are configured to be presented in another electronic marketplace, on behalf of the user, offering an item that the user offers in an electronic marketplace associated with the service. In accordance with at least one embodiment, the service may generate the network document for an item that the user does not currently offer in the electronic marketplace associated with the service but wishes to offer in another electronic marketplace. In accordance with at least one embodiment, the network document includes an item detail page for an item that is to be offered in another electronic marketplace. For example, the item detail page may include information that would allow a customer to order and purchase the item from the user such as price, item details (item name, a short description, variations if any), delivery time, item reviews, and seller/user reviews.

In accordance with at least one embodiment, the service may notify or indicate to the user that one or more network documents have been generated and are ready to be implemented in other electronic marketplaces on behalf of the user. In accordance with at least one embodiment, the service may notify the user that a network document is generated by sending a report, via email, of identified marketplaces, potential profit to be made in offering their items in the identified marketplaces, and information informing the user that network documents have already been generated for implementing the offering of items in the identified marketplaces. In accordance with at least one embodiment, the service may notify the user with a short message presented to the user via a user interface while the user is interacting with an electronic marketplace associated with the service. In accordance with at least one embodiment, the service may indicate to the user that the network documents have been generated and are waiting to be implemented with the user's offerings while the user is interacting with the electronic marketplace with a message and a button on a user interface, indicating a one-click option. In accordance with at least one embodiment, the service may notify the user that the network documents are generated with periodic emails sent to the user's email account. In accordance with at least one embodiment, the email may contain links which would begin the process of implementing the item offerings on behalf of the user in other electronic marketplaces by the service. In accordance with at least one embodiment, the service may notify the user that the network documents are generated with an electronic message or a user interface element presented to the user via a user interface provided by an electronic marketplace associated with the service.

In accordance with at least one embodiment, the service may recommend other marketplaces for the user to offer their items in based on obtained marketplace data, including information about item categories currently being offered in other electronic marketplaces. In accordance with at least one embodiment, the service may compare item categories currently being offered by the user in an electronic marketplace associated with the service to item categories identified from the marketplace data to recommend other marketplaces. For example, the service may identify that the user is currently offering staples and paper clips which correspond to an item category of office supplies. The service may identify that in another marketplace there is a need to sell pens and pencils which also correspond to the office supplies category. Thus, the service may identify the other marketplace, determine implementation information for the other marketplace, and generate a network document that would allow the user to offer their items of the category office supplies in the identified other marketplace. In accordance with at least one embodiment, the marketplace data can include a deficiency of items offered in other electronic marketplaces or third party marketplaces. In accordance with at least one embodiment, the service may perform a mapping of item category information between marketplaces to recommend a marketplace. In accordance with at least one embodiment, the service may identify categories of items offered by other electronic marketplaces by utilizing keyword analysis of offered items or by utilizing item properties of offered items in other marketplaces. In accordance with at least one embodiment, the service may perform a manual in person-review of item offerings from the marketplace data to determine item categories. In accordance with at least one embodiment, the service may notify the user that the network documents are generated which would allow the user to being offering items in another marketplace. In accordance with at least one embodiment, the service may notify the user that a network document has been generated for an item that the user does not currently offer but that the user could potentially begin offering based on the obtained category data of the other marketplaces.

In accordance with at least one embodiment, the service may identify other electronic marketplaces for the user to offer their items based on marketplace data obtained from third party marketplaces. For example, the third party marketplace data could include item stock deficiencies for certain items in particular geographic regions. In accordance with at least one embodiment, the service may identify other electronic marketplaces for the user to offer their items based on trending data obtained from social networking sites. For example, the service may receive social network trending data from a social networking site indicating an increase in certain keywords. The keywords could be related to actual item descriptions in social networking posts, or they could be related to geographic locations. In accordance with at least one embodiment, the service may obtain data from social networking sites that includes impression metrics from certain advertisements. In accordance with at least one embodiment, the service can utilize the trending data or third party marketplace data to identify other electronic marketplaces, determine implementation information for the other electronic marketplaces, and generate network documents for items offered by the user for presentation in the other electronic marketplaces. As used herein, the phrase "trending data" includes impression metric data, keyword analysis data, or social network input from a user.

FIG. 1 illustrates an example network document for an item offered by a user in an electronic marketplace and several implementations of the same item offered in other electronic marketplaces on behalf of the user as described herein, according to at least one example. In accordance with at least one embodiment, the network document 100 is presented using a web browser 102. The network document 100 illustrated in FIG. 1 includes an address bar 104, where a user may enter a Uniform Resource Locator (URL) to view a network document for an item offered by the user in an electronic marketplace associated with the service. For example, the network document 100 may be presented to a user in response to the user viewing their offered inventory in the electronic marketplace associated with the service. Further, the network document 100 includes an item image 106 and an item description 108. In accordance with at least one embodiment, the item description 108 can include information about the item such as an alpha-numeric description of the item, a monetary price for the item, shipping options available for the item, and customer review ratings.

The network document 100 illustrated in FIG. 1 includes category, department, and brand information 110 associated with the item. Further, the network document 100 includes a notification button 112, the notification button 112 can indicate to the user that they can begin offering items in other electronic marketplaces. In accordance with at least one embodiment, upon receiving input from a user, such as the user clicking on notification button 112 in the network document 100, the service may present one or more network documents 114, 116, and 118 that are configured to be presented in other electronic marketplaces on behalf of the user. In this example, three network documents 114, 116, and 118 with appropriate currencies for their respective target marketplace have been generated for the item 106 for further presentation in a Chinese electronic marketplace, a French electronic marketplace, and an Indian electronic marketplace. In accordance with at least one embodiment, the user may review the network documents 114, 116, and 118 before the service implements them within their respective electronic marketplaces. In accordance with at least one embodiment, the network document 100 may be presented to the user while the user is viewing a listing of an item that they offer in the electronic marketplace associated with the service. The notification button 112 can be provided to the user via the network document displaying an item detail page for an item offered by the user.

In accordance with at least one embodiment, the user can further edit or modify the network documents via a user interface (not shown). For example, the user may wish to offer the item at a higher price than that indicated by the service as shown in the network documents 114, 116, and 118. In accordance with at least one embodiment, the service may determine implementation information for the network documents 114, 116, and 118, including a competitive market price based at least in part on user data and item data associated with the item 106, 108. In accordance with at least one embodiment, the service may have previously generated the network documents 114, 116, and 118 based at least in part on the implementation information. In accordance with at least one embodiment, once the user has approved the one or more network documents 114, 116, and 118, the service may implement the network documents 114, 116, and 118 in their respective electronic marketplaces on behalf of the user.

Figure 2:
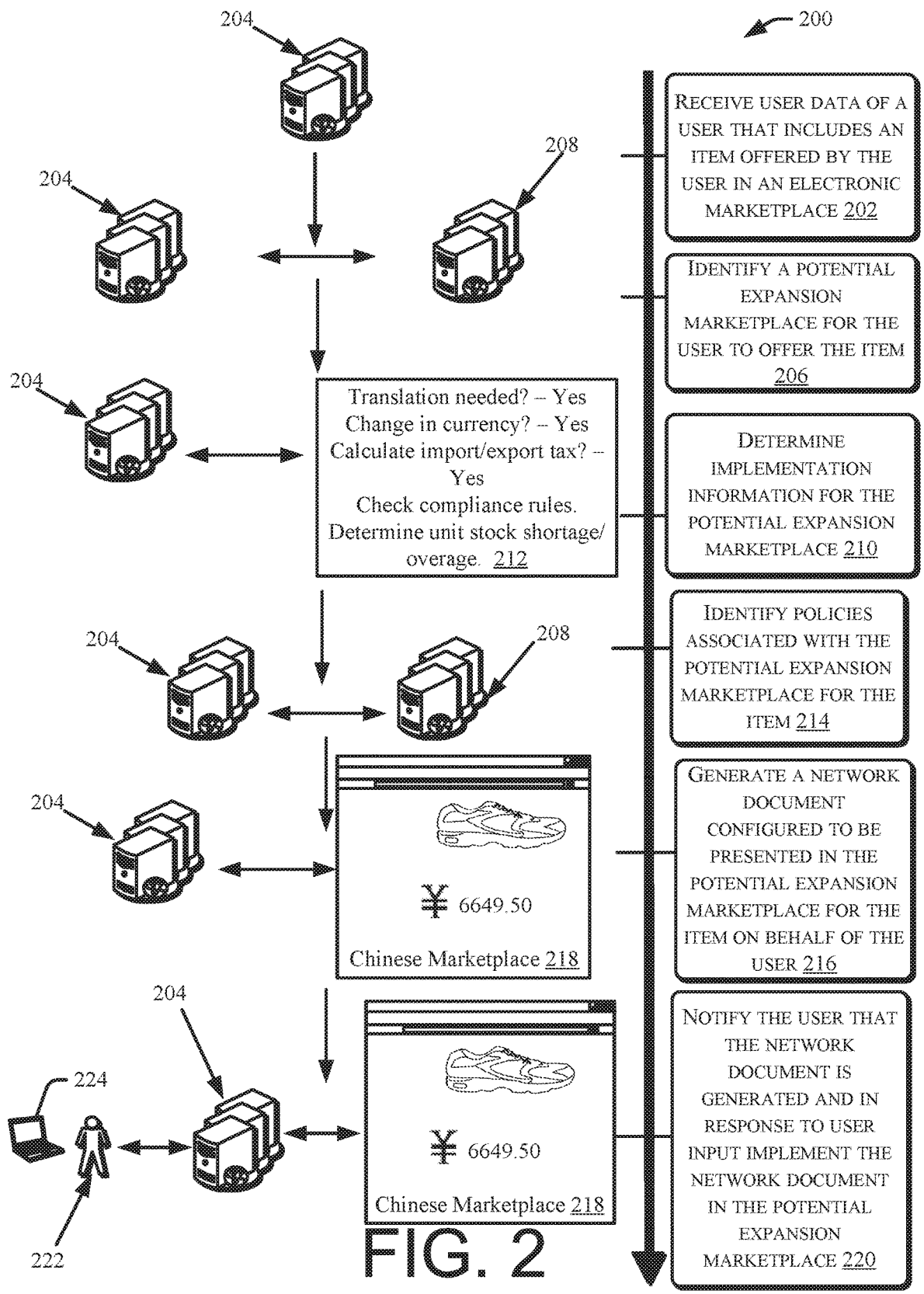
FIG. 2 illustrates a data flow for providing a marketplace recommendation and implementation feature described herein, according to at least one example.

FIG. 2 illustrates a data flow for providing a marketplace recommendation and implementation feature described herein, according to at least one example. The order in which the operations are described is not intended to be construed as a limitation, and any number of the described operations can be combined in any order and/or in parallel to implement the described data flow. It should be noted in the following example, vertical arrows present in FIG. 2 represent the transition from one step to the next in the method 200 and the horizontal double sided arrows represent the data flow of information between the two objects on either side of the arrow. In one non-limiting example, the method 200 can receive user data of a user that includes an item offered by the user in a first electronic marketplace 202. For example, one or more service provider computers 204 can receive or obtain user data from users of an electronic marketplace associated with the service. In accordance with at least one embodiment, the one or more service provider computers 204 can receive data directly from the users. For example, a user may wish to offer an item that they currently do not offer in any marketplace in another electronic marketplace other than the electronic marketplace associated with the service.

The method 200 may identify a potential expansion marketplace for the user to offer the item 206. As used herein, the phrase "potential expansion marketplace" includes an electronic marketplace other than a marketplace associated with the service that a user could potentially offer their items in. For example, the one or more service provider computers 204 can identify other electronic marketplaces 208 for the user to offer their item based on the user data. In accordance with at least one embodiment, the one or more service provider computers 204 can identify the other electronic marketplaces 208 by comparing item offerings of the other electronic marketplaces 208 to the user data. Information from the other electronic marketplaces 208 may have been previously obtained and stored within data stores maintained and accessed by the one or more service provider computers 204. In an example, the one or more service provider computers 204 can receive information from the other electronic marketplaces 208 via one or more networks (not shown).

The method 200 may determine implementation information for the potential expansion marketplace 210. For example, the one or more service provider computers 204 may determine implementation information 212 via a machine learning algorithm utilizing the user data and item data associated with the at least one item. In the present example, implementation information 212 can include information indicating whether translation is required to offer the item in the potential expansion marketplace, whether a change of currency is required, a calculation of import/export regulations and tax consequences, an analysis of compliance rules for the potential expansion marketplace, and a determination of an item stock deficiency or shortage in the potential expansion marketplace. The method 200 may identify policies associated with the potential expansion marketplace 214. For example, the one or more service provider computers 204 may maintain and access a set of policies associated with a potential expansion marketplace 208. In accordance with at least one embodiment, the one or more service provider computers 204 can obtain or update the set of policies from the potential expansion marketplace 208 via one or more networks (not shown). The policies associated with the potential expansion marketplace 208 may include a limit on number of units offered for an item, either a maximum or minimum limit, price change limits, or translation requirements.

The method 200 may generate a network document configured to be presented in the potential expansion marketplace for an item offered by the user, on behalf of the user 216. For example, the one or more service provider computers 204 may generate a network document 218 for an item offered by the user currently in an electronic marketplace associated with the service. The network document 218 can include a translated, compliant, item detail page with appropriate currency configured to be presented in a potential expansion marketplace 208. In accordance with at least one embodiment, the one or more service provider computers 204 may generate network document 218 based at least in part on the implementation information 212 and the policies associated with the potential expansion marketplace 208. The method 200 may notify the user that the network document is generated and in response to user input, implement the network document in the potential expansion marketplace 220. For example, the one or more service provider computers 204 can notify a user 222 via an email accessible by the user utilizing a computing device 224. The user 222 can provide input to the one or more service provider computers 204 indicating that they wish to expand their item offerings into the identified other marketplaces or potential expansion marketplace 208 with the generated network document 218. In accordance with at least one embodiment, the service may identify one more other electronic marketplaces and generate network documents for one or more items offered by the user, or not currently offered by the user.

Figure 3:
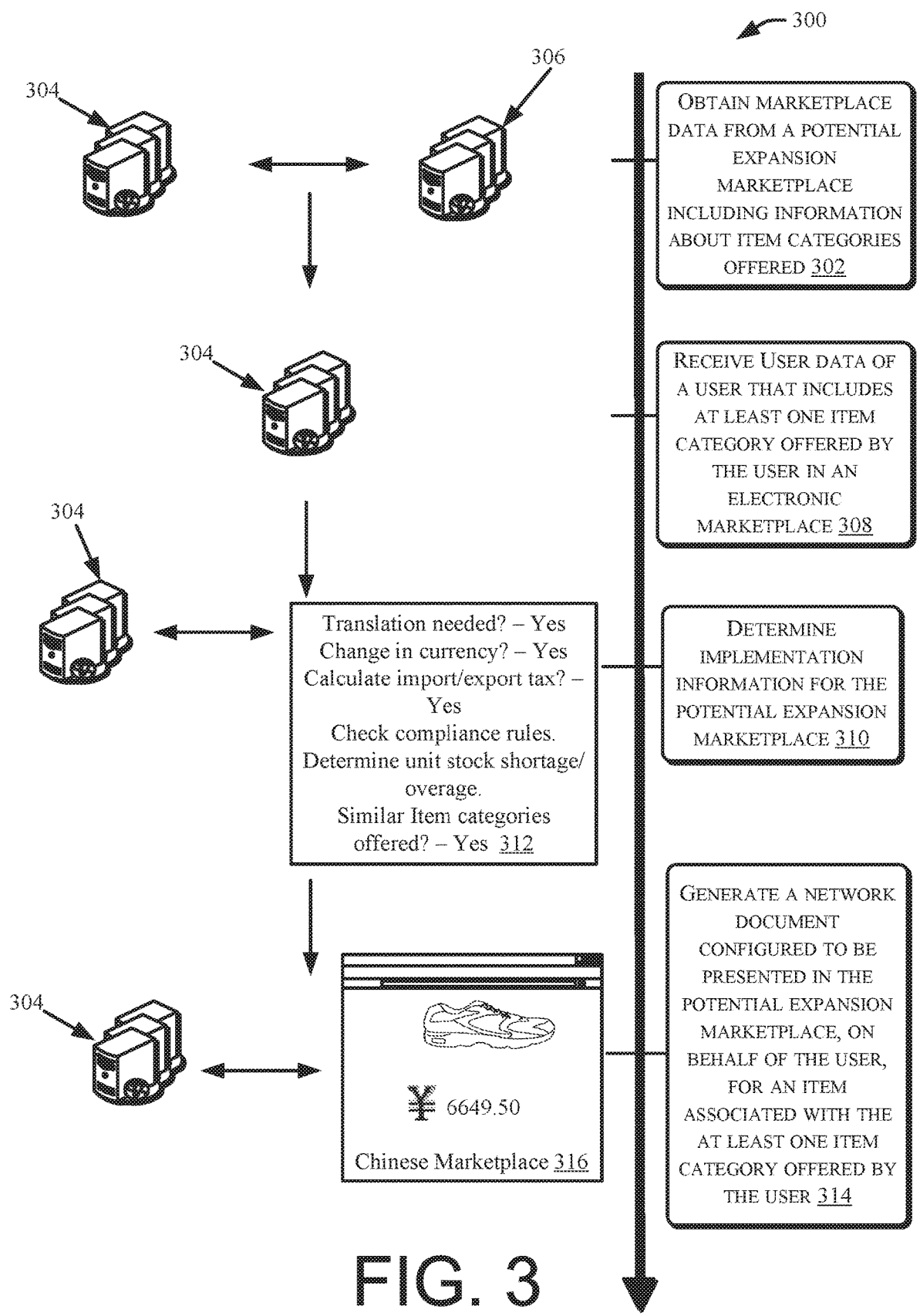
FIG. 3 illustrates a data flow for providing a marketplace recommendation and implementation feature described herein, according to at least one example.

FIG. 3 illustrates a data flow for providing a marketplace recommendation and implementation feature described herein, according to at least one example. The order in which the operations are described is not intended to be construed as a limitation, and any number of the described operations can be combined in any order and/or in parallel to implement the described data flow. It should be noted in the following example, vertical arrows present in FIG. 2 represent the transition from one step to the next in the method 200 and the horizontal double sided arrows represent the data flow of information between the two objects on either side of the arrow. In one non-limiting example, the method 300 can obtain marketplace data from a potential expansion marketplace including information about item categories offered in the potential expansion marketplace 302. For example, one or more service provider computers 304 can receive or obtain marketplace data from a potential expansion marketplace 306 via one or more networks (not shown). In accordance with at least one embodiment, the service can obtain marketplace data from data stores maintained by the service from previous information exchanges between the service and other electronic marketplaces or third party information sources such as social networking sites. The method 300 may receive user data of a user that includes at least one item category offered by the user in an electronic marketplace associated with the service 308. For example, the one or more service provider computers 304 can receive or obtain user data from users of an electronic marketplace associated with the service. In accordance with at least one embodiment, a user can provide their user data to the service where the user data can include one or more categories of items offered by the user in an electronic marketplace associated with the service.

The method 300 may determine implementation information for the potential expansion marketplace 310. For example, the one or more service provider computers 304 may determine implementation information 312 for the potential expansion marketplace via a machine learning algorithm utilizing the user data and the marketplace data. In the present example, implementation information 312 can include information indicating whether translation is required to offer the item in the potential expansion marketplace, whether a change of currency is required, a calculation of import/export regulations and tax consequences, an analysis of compliance rules for the potential expansion marketplace, a determination of an item stock deficiency or shortage in the potential expansion marketplace, and a comparison of item categories offered by the potential expansion marketplace and item categories offered by the user or possible item categories that could be offered by the user.

The method 300 may generate a network document configured to be presented in the potential expansion marketplace, on behalf of the user, for an item associated with at least one item category offered by the user 314. For example, the one or more service provider computers 304 can generate a network document 316 for presentation in the potential expansion marketplace. The network document 316 can include a translated, compliant, item detail page with appropriate currency configured to be presented in a potential expansion marketplace 306. In accordance with at least one embodiment, the one or more service provider computers 304 may generate network document 316 based at least in part on the implementation information 312. In accordance with at least one embodiment, the service may notify the user that the network document is generated and in response to user input, implement the network document in the potential expansion marketplace. In accordance with at least one embodiment, the service may identify one more other electronic marketplaces and generate network documents for one or more item categories offered by the user, or not currently offered by the user. In accordance with at least one embodiment, the user data in can include a request from the user to offer items associated with various categories in other marketplaces or the user data can include an interest in offering an item that they currently do not offer in an electronic marketplace associated with the service but may wish to offer in other identified electronic marketplaces.

Figure 4:
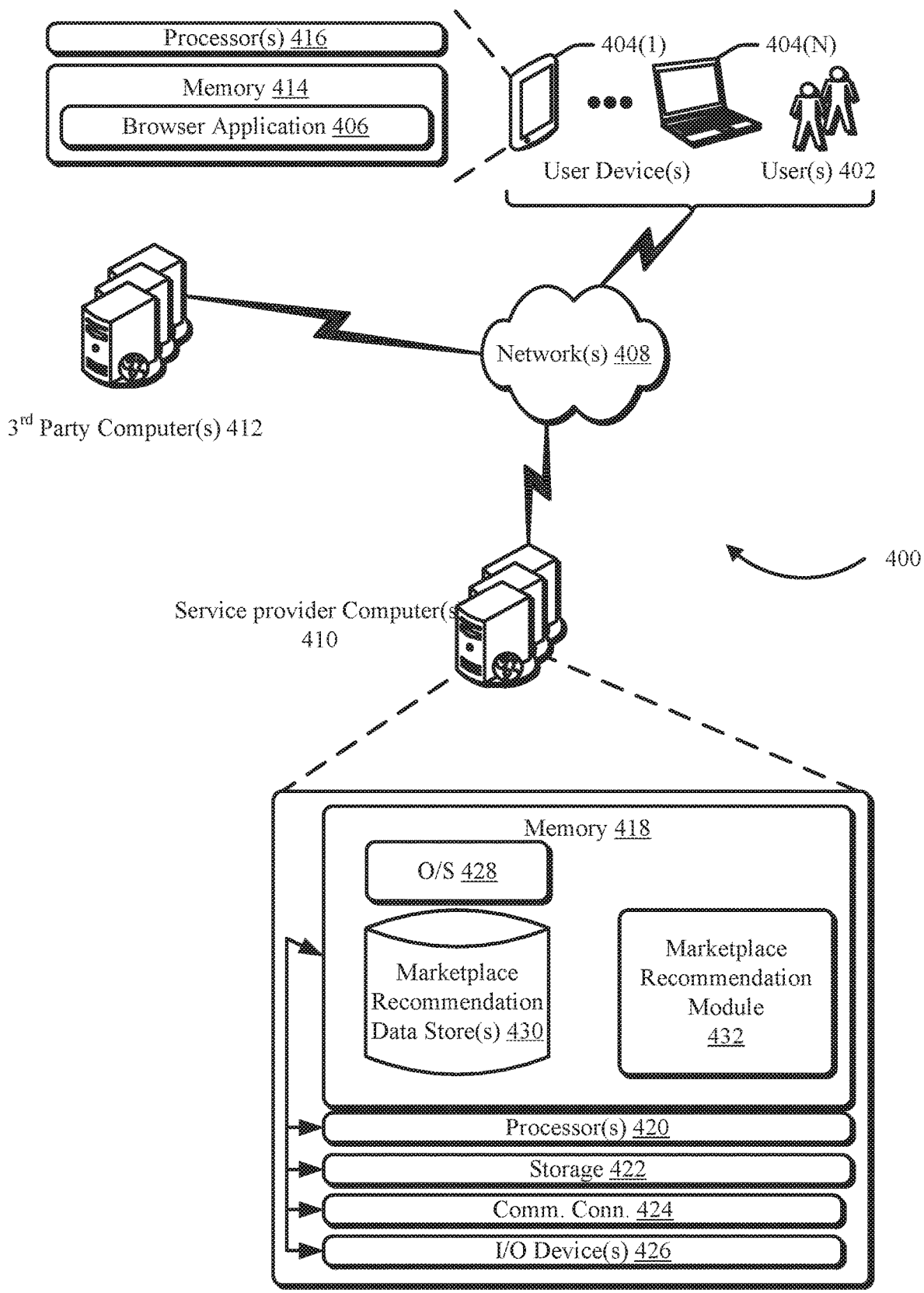
FIG. 4 illustrates an example architecture for a marketplace recommendation and implementation feature described herein that includes one or more service provider computers and/or a user device connected via one or more networks, according to at least one example.

FIG. 4 illustrates an example architecture for a marketplace recommendation and implementation feature described herein that includes one or more service provider computers, one or more third party computers, and/or a user device connected via one or more networks, according to at least one example. In architecture 400, one or more users 402 (i.e., marketplace recommendation and implementation service users) may utilize user computing devices 404(1)-(N) (collectively, user devices 404) to access an application 406 (e.g., a web browser), via one or more networks 408. In some aspects, the application 406 may be hosted, managed, and/or provided by a computing resources service or service provider, such as by utilizing one or more service provider computers and/or one or more marketplace recommendation and implementation service computers 410. The one or more service provider computers 410 may provide a native application which is configured to run on the user devices 404 which the user 402 may interact with to offer items and receive notifications that network documents for offering items in other electronic marketplaces are generated and ready to be implemented. The one or more service provider computers 410 may, in some examples, provide computing resources such as, but not limited to, client entities, low latency data storage, durable data storage, data access, management, virtualization, cloud-based software solutions, electronic content performance management, etc. The one or more service provider computers 410 may also be operable to provide web hosting, computer application development, and/or implementation platforms, combinations of the foregoing, or the like to the one or more users 402. The one or more service provider computers 410, in some examples, may identify one or more other electronic marketplaces for the user to offer their items in, generate one or more network documents to be presented in the other electronic marketplaces, and implement the network documents in the other electronic marketplaces on behalf of the user. In some examples, the one or more service provider computers 410 may communicate with one or more third party computers 412 to provide services associated with marketplace recommendation and implementation.

In some examples, the networks 408 may include any one or a combination of many different types of networks, such as cable networks, the Internet, wireless networks, cellular networks and other private and/or public networks. While the illustrated example represents the users 402 accessing the application 406 over the networks 408, the described techniques may equally apply in instances where the users 402 interact with the one or more service provider computers 410 via the one or more user devices 404 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 406 may allow the users 402 to interact with a service provider computer, such as to access web content (e.g., web pages, music, video, etc.). The one or more service provider computers 410, perhaps arranged in a cluster of servers or as a server farm, may host the application 406 and/or cloud-based software services. Other server architectures may also be used to host the application 406. The application 406 may be capable of handling requests from many users 402 and serving, in response, various item web pages. The application 406 can provide any type of website that supports user interaction, including social networking sites, online retailers, informational sites, blog sites, search engine sites, news and entertainment sites, and so forth. As discussed above, the described techniques can similarly be implemented outside of the application 406, such as with other applications running on the user devices 404.

The user devices 404 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 404 may be in communication with the one or more service provider computers 410 via the networks 408, or via other network connections. Additionally, the user devices 404 may be part of the distributed system managed by, controlled by, or otherwise part of the one or more service provider computers 410 (e.g., a console device integrated with the one or more service provider computers 410).

In accordance with at least one embodiment, the user devices 404 may include at least one memory 414 and one or more processing units (or processor(s)) 416. The processor(s) 416 may be implemented as appropriate in hardware, computer-executable instructions, firmware, or combinations thereof. Computer-executable instruction or firmware implementations of the processor(s) 416 may include computer-executable or machine-executable instructions written in any suitable programming language to perform the various functions described. The user devices 404 may also include geo-location devices (e.g., a global positioning system (GPS) device or the like) for providing and/or recording geographic location information associated with the user devices 404.

The memory 414 may store program instructions that are loadable and executable on the processor(s) 416, as well as data generated during the execution of these programs. Depending on the configuration and type of user device 404, the memory 414 may be volatile (such as random access memory (RAM)) and/or non-volatile (such as read-only memory (ROM), flash memory, etc.). The user device 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM.

Turning to the contents of the memory 414 in more detail, the memory 414 may include an operating system and one or more application programs or services for implementing the features disclosed herein including at least a user provided input element or electronic service web page, such as via the browser application 406 or dedicated applications (e.g., smart phone applications, tablet applications, etc.). The browser application 406 may be configured to receive, store, and/or display a website or other interface for interacting with the one or more service provider computers 410. Additionally, the memory 414 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 402 provided response to a security question or a geographic location obtained by the user device 404.

In some aspects, the one or more service provider computers 410 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the one or more service provider computers 410 may be in communication with the user devices 404 and/or other service providers via the networks 408, or via other network connections. The one or more service provider computers 410 may include one or more servers, perhaps arranged in a cluster, as a server farm, or as individual servers not associated with one another. These servers may be configured to implement the marketplace recommendation and implementation services described herein as part of an integrated, distributed computing environment.

In one illustrative configuration, the one or more service provider computers 410 may include at least one memory 418 and one or more processing units (or processor(s)) 420. The processor(s) 420 may be implemented as appropriate in hardware, computer-executable instructions, firmware, or combinations thereof. Computer-executable instruction or firmware implementations of the processor(s) 420 may include computer-executable or machine-executable instructions written in any suitable programming language to perform the various functions described.

The memory 418 may store program instructions that are loadable and executable on the processor(s) 420, as well as data generated during the execution of these programs. Depending on the configuration and type of the one or more service provider computers 410, the memory 418 may be volatile (such as RAM) and/or non-volatile (such as ROM, flash memory, etc.). The one or more service provider computers 410 or servers may also include additional storage 422, which may include removable storage and/or non-removable storage. The additional storage 422 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 418 may include multiple different types of memory, such as SRAM, DRAM, or ROM.

The memory 418, the additional storage 422, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 418 and the additional storage 422 are all examples of computer storage media. Additional types of computer storage media that may be present in the one or more service provider computers 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 410 may also contain communications connection(s) 424 that allow the one or more service provider computers 410 to communicate with a stored database, another computing device or server, user terminals and/or other devices on the networks 408. The one or more service provider computers 410 may also include I/O device(s) 426, such as a keyboard, a mouse, a pen, a voice input device, a touch input device, a display, speakers, a printer, etc.

Turning to the contents of the memory 418 in more detail and as will be described in further detail with reference to FIG. 5, the memory 418 may include an operating system 428, one or more data stores 430, and/or one or more application programs or services for implementing the features disclosed herein including a marketplace recommendation module 432. In accordance with at least one embodiment, the marketplace recommendation module 432 may be responsible for receiving user data, identifying other electronic marketplaces for a user to offer their items, determine implementation information for the identified electronic marketplaces, generate network documents for presentation in the identified electronic marketplace, notify the user that the generated network documents are ready to be implemented, and implementing the network documents in the identified electronic marketplaces on behalf of the user.

Figure 5:
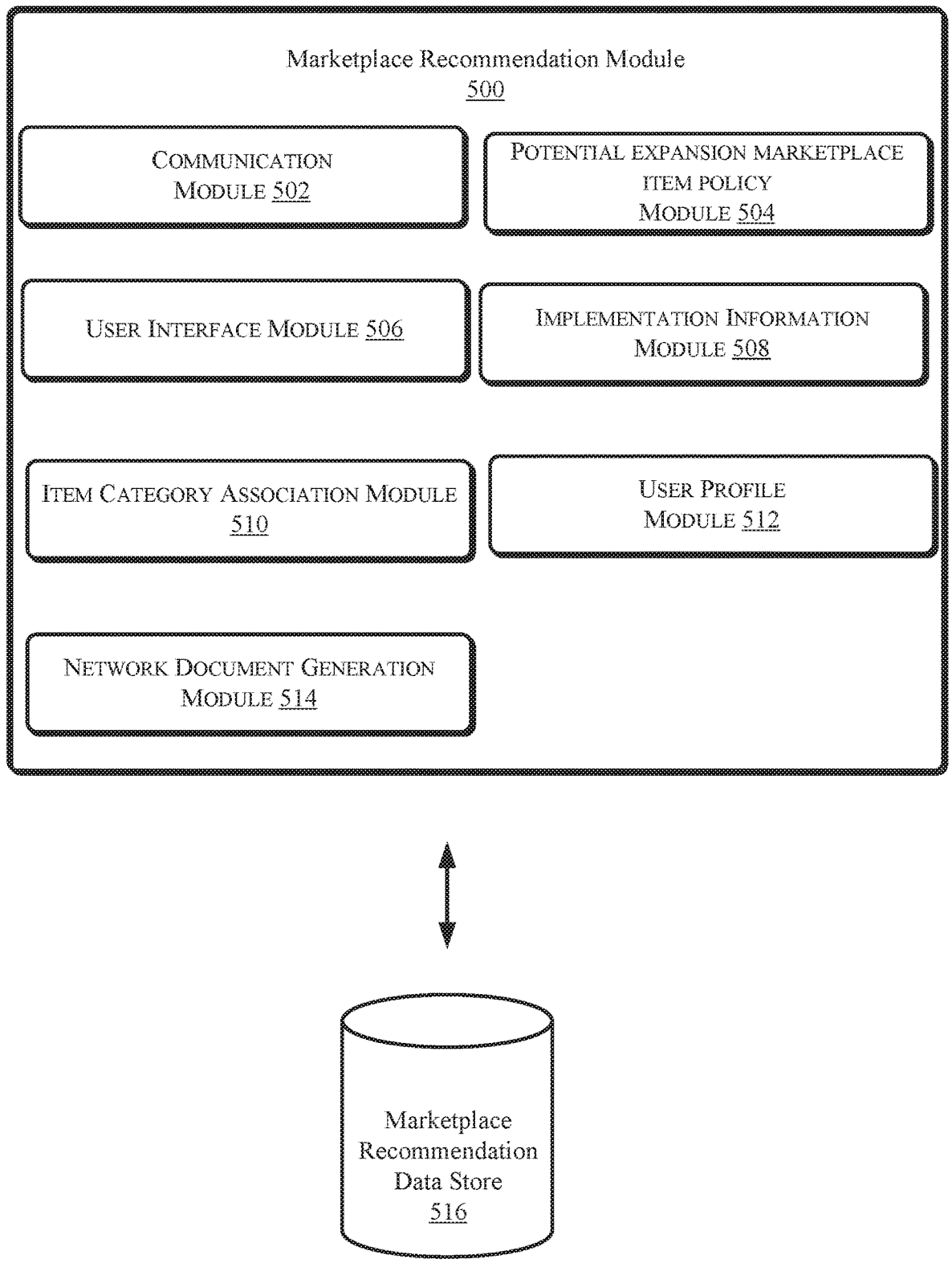
FIG. 5 illustrates a schematic diagram depicting aspects of an example marketplace recommendation module, according to at least one example.

FIG. 5 illustrates a schematic diagram depicting aspects of an example marketplace recommendation module, according to at least one example. The marketplace recommendation module 500 may be an example of marketplace recommendation module 432 from FIG. 4. The modules included within and including the marketplace recommendation module 500 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggested in FIG. 5 or may exist as separate modules.

In accordance with at least one embodiment, the marketplace recommendation module 500 may contain a communication module 502, a potential expansion marketplace item policy module 504, a user interface module 506, a implementation information module 508, an item category association module 510, a user profile module 512, and a network document generation module 514. In accordance with at least one embodiment, the modules 500-514 may be in communication with one or more data stores 516. In accordance with at least one embodiment, the marketplace recommendation module 500 may be configured to receive or obtain user data and identify other electronic marketplaces for a user to offer their items. In accordance with at least one embodiment, the communication module 502 and user interface module 506 may be configured to receive user input from a user about items the user wishes to offer or is currently offering in an electronic marketplace associated with the service. In accordance with at least one embodiment, the marketplace recommendation module 500 may receive or obtain user data from the user profile module 512. In accordance with at least one embodiment, the marketplace recommendation module 500 and the communication module 502 may be responsible for obtaining marketplace data from other electronic marketplaces associated with the service but located in different geographic regions, or third party electronic marketplaces. In accordance with at least one embodiment, the marketplace recommendation module 500 may communicate with one or more third party computers to obtain marketplace data or social networking data via networks 408 from one or more third party computers 412 (FIG. 4).

In accordance with at least one embodiment, the marketplace recommendation module 500 may identify other electronic marketplaces for the user to offer their items based on deficient item stock information obtained from electronic marketplaces associated with the service or from third party electronic marketplaces. In accordance with at least one embodiment, the marketplace recommendation module 500 may identify other electronic marketplaces for the user to offer their items and store/maintain the identified other electronic marketplaces in the marketplace recommendation data store 516 for later use. In accordance with at least one embodiment, the communication module 502 and the user interface module 506 may be responsible for notifying the user that a network document has been generated for implementing the offering of items on behalf of the user in other electronic marketplaces. In accordance with at least one embodiment, the communication module 502 and user interface module 506 may be responsible for receiving user input from the user which indicates to the service that the generated network documents should be implemented in the identified other electronic marketplaces. In accordance with at least one embodiment, the communication module 502, user interface module 506, and user profile module 512 may be configured to notify the user that generated network documents are ready to be implemented or reviewed and then implemented. In accordance with at least one embodiment, the communication module 502 obtains user data from the user profile module 512 to generate a notification to the user via: a user interface implemented by the user interface module 506, an email notification to an email maintained for the user by the user profile module 512, a report of identified electronic marketplaces, profit margins, compliance information, etc.; or a notification and nudge presented to the user interacting with the electronic marketplace associated with the service in the form of a message and one-click button 112 (FIG. 1), or any suitable method of notifying the user via a user interface presented to the user via a web browser or native application. In accordance with at least one embodiment, the marketplace recommendation module 500 may be configured to calculate a score for each identified other electronic marketplace. For example, the marketplace recommendation module 500 may utilize machine learning algorithm and user data to identify that the user is most interested in increased profit margins, thus placing a higher score on identified marketplaces that would offer high profit margins to the user. In another example, the marketplace recommendation module 500 may utilize the user data to identify that the user is most interested in moving the most units that they currently offer, thus placing a higher score on identified marketplaces that indicate the most units are being sold in, albeit at a lower price. The marketplace recommendation module 500 may assign scores to the identified electronic marketplaces and only generate network documents for a certain number of the highest scoring electronic marketplaces. The marketplace recommendation module 500 may assign scores to the identified electronic marketplaces based at least in part on direct user provided data, for example provided by a questionnaire presented to the user via their user profile. In accordance with at least one embodiment, the marketplace recommendation module 500 may assign scores to the identified electronic marketplaces based on customer reviews of the items offered by the user, or items the user wishes to offer in other marketplaces. In accordance with at least one embodiment, the customer reviews may modify or further update scores already calculated by the marketplace recommendation module 500.

In accordance with at least one embodiment, the potential expansion marketplace item policy module 504 may be configured to obtain or receive policies associated with items offered in other electronic marketplaces. The potential expansion marketplace item policy module 504 may store and maintain the policies in the one or more data stores 516. In accordance with at least one embodiment, the service may store and maintain its own policies regarding items offered by users for use in determining implementation information for other electronic marketplaces. In accordance with at least one embodiment, item policies include policies regarding maximum or minimum item offering limits, price increase or reduction limits, shipping procedures and limitations, limits on materials that can be shipped to certain geographic regions, or any suitable policy appropriate for item offerings in an electronic marketplace. In accordance with at least one embodiment, the user interface module 506 may be configured to present to the user the generated network documents for the other electronic marketplaces. In accordance with at least one embodiment, the user interface module 506 may be configured to present the generated network documents in the other electronic marketplaces on behalf of the user and receive and process orders for items offered by the user in the other electronic marketplaces.

In accordance with at least one embodiment, the implementation information module 508 may be configured to determine implementation information for the identified other electronic marketplaces as identified by the marketplace recommendation module 500. In accordance with at least one embodiment, the implementation information module 508 may determine the implementation information via a machine learning algorithm or an algorithm utilizing user data, item data associated with at least one item indicated by the user data, item category data, marketplace data, or social networking trend data. It should be noted that the implementation information may be determined based on any single data point described above or any combination of data points described herein. As described above, the implementation information can include information that may be necessary to offer items in a marketplace such as: export/import requirements, tax information, compliance information, language translation information, market prices, comparable prices from similar items, and shipping requirements for identified geographic locations. In accordance with at least one embodiment, the implementation information module 508 may be configured to identify other variations of items offered by the user for later use in generating a network document. In accordance with at least one embodiment, the implementation information module 508 may identify other variations of items offered by the user by accessing a current inventory list maintained for user and determining all possible variations for a product when utilizing color scale, size, or any acceptable variation parameter for an item. For example, if a user currently offers only blue t-shirts with a certain logo and marketplace data indicates that red t-shirts with the same logo are selling very well, the implementation module 508 may determine implementation information identifying such a possibility for use in generating a network document. The network document generation module 514 may generate a network document for variations of items offered by a user based on the implementation information determined by the implementation module 508.

In accordance with at least one embodiment, the item category association module 510 may be configured to determine item categories offered by a user, compare the user's offered item categories to other electronic marketplace offered item categories, and recommend items associated with comparable categories for the user to offer in identified electronic marketplaces. In accordance with at least one embodiment, the item category association module 510 in conjunction with the communication module 502 may be responsible for obtaining item category information or marketplace information from other electronic marketplaces. In accordance with at least one embodiment, the implementation information module 508 may utilize the marketplace or item category information to determine the implementation information for identified electronic marketplaces. In accordance with at least one embodiment, the item category association module 510 may be configured to determine item stock deficiencies in other electronic marketplaces based on marketplace data. For example, the item category association module 510 may obtain data from another electronic marketplace indicating that the marketplace is currently out of stock of a certain item that the user currently offers in an electronic marketplace. The item category association module 510 may provide marketplace data to the implementation information module 508 to provide implementation information that will be utilized to generate a network document offering the out of stock item on behalf of the user in the identified electronic marketplace. In accordance with at least one embodiment, the marketplace recommendation module 500 may identify another electronic marketplace based at least in part on the marketplace data obtained by the item category association module 510. In accordance with at least one embodiment, the marketplace data obtained by the item category association module 510 may be stored and maintained in the one or more data stores 516. In accordance with at least one embodiment, the item category association module 510 may be configured to receive or obtain social network trend data from social networks. As described above, the social network trend data may be utilized by the implementation information module 508 to generate implementation information. For example, the social network trend data may indicate that a certain professional football team's products are currently selling at an increased rate. This social network trend data may be utilized by the implementation information module 508 to generate implementation information that will in turn be utilized to generate a network document for the user to sell the same professional football team products if the user currently offers the items in an electronic marketplace. In accordance with at least one embodiment, the social network trend data may include keyword analysis information obtained from an analysis of information posted on a user's social networking site. The keyword analysis information may include a string filter process that involves identifying keywords that are maintained by the service. In accordance with at least one embodiment, the social network trend data may include obtaining social network trend data related to geographic location information. For example, certain topics or items may be trending or hot interest topics in only certain geographic regions. The service may be able to identify the geographic locations of the trending items and identify a marketplace for the user to expand their item listings within based on the geographic location information obtained from a social networking site. In accordance with at least one embodiment, the social network trend data may include analyzing impression metrics from advertisements displayed on the social networking site. The service may be able to obtain impression metrics from the social networking site and analyze the impression metrics to determine trending items or geographic locations to identify a marketplace for the user to expand their item listings within. In accordance with at least one embodiment, the item category association module 510 may provide item category data in the form of marketplace data from the social networking trend data to the implementation information module 508.

In accordance with at least one embodiment, the network document generation module 514 may be configured to generate one or more network documents for presentation in identified other electronic marketplaces. The network document generation module 514 may generate the network documents based at least in part on the implementation information generated by the implementation information module 508, item policies identified by the potential expansion marketplace item policy module 504, or marketplace data obtained by the item category association module 510. The network document generation module 514 may generate the network documents based on any one or combination of the above described implementation information, item policies, or marketplace data. In accordance with at least one embodiment, the network document generation module 514 may generate one or more network documents for a user and store the network documents in one or more data stores 516 until the user has been notified and provided input indicating that the user wishes for the network documents to be implemented in the identified other electronic marketplaces. In accordance with at least one embodiment, in response to the user providing input regarding implementation of the network documents, the network document generation module 514 and the communication module 502 may be responsible for implementing the one or more generated network documents in identified electronic marketplaces on behalf of the user. In accordance with at least one embodiment, the user profile module 512 may be configured to gather user trend data. In accordance with at least one embodiment, user trend data can include information about when a user likes to offer items in an electronic marketplace, as in which parts of the calendar year, or even which day of the week, whether a user has participated in other programs offered by the electronic marketplace associated with the service, whether the user has previously responded to notifications that network documents have been generated for other marketplaces, profit margins, or acceptance or rejection of calculated price points for offered items. The user profile module 512 may provide the user trend data to the marketplace recommendation module 500 to identify potential expansion marketplaces or to the implementation information module 508 to generate implementation information for the generated network documents. The user interface module 506 and the user profile module 512 may be configured to receive and maintain data regarding user choices when presented with generated network documents. For example, a user may customarily raise the provided item price for any items included in the generated network documents by 10%. This information may be maintained and provided to the implementation information module 508 to generate future implementation information for use in generating network documents. The user interface module 506 and the user profile module 512 may be configured to receive and maintain data regarding other user choices as well, whether they are stylistic or substantive to the generated network documents before they are approved for implementation.

Figure 6:
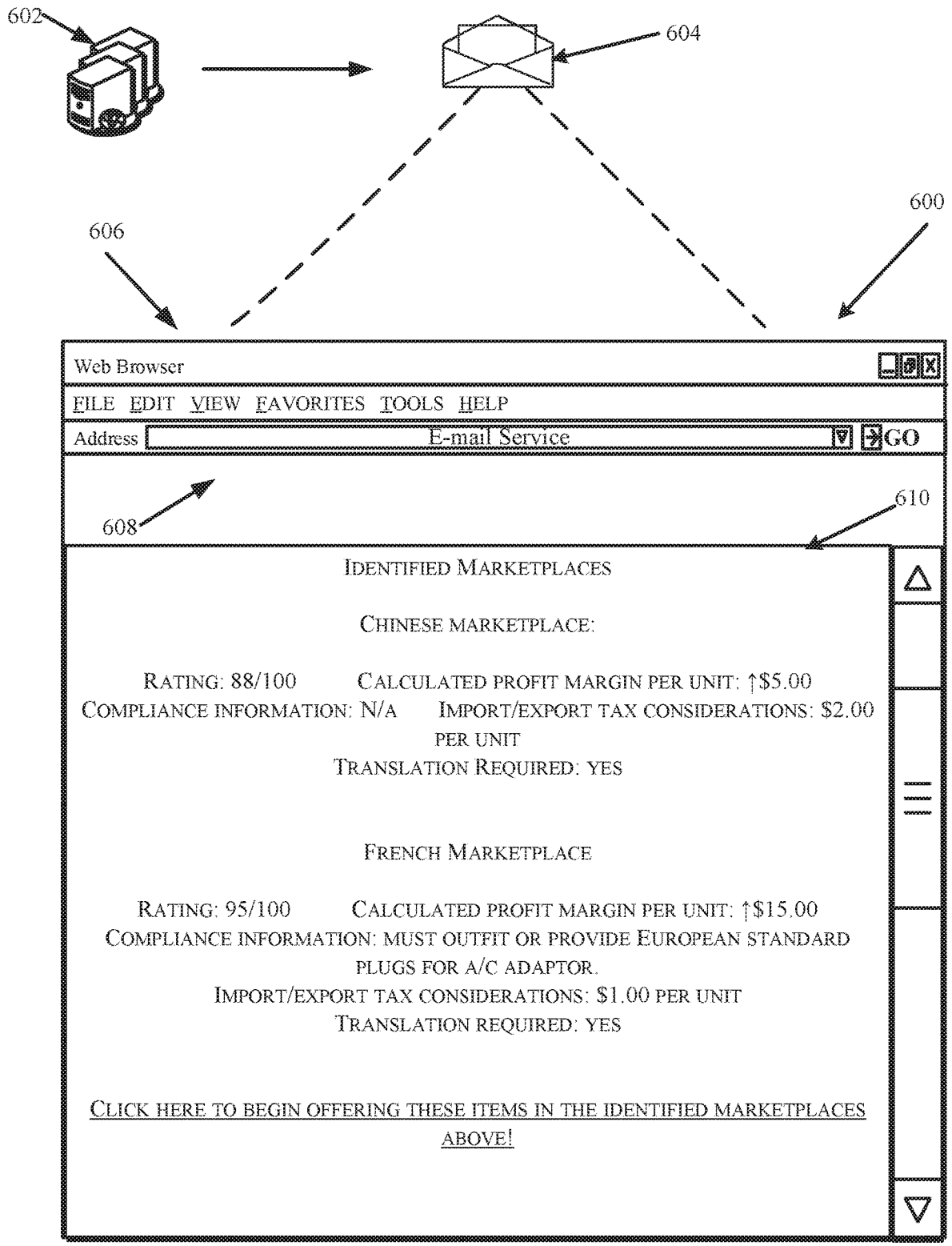
FIG. 6 illustrates an example report from a marketplace recommendation and implementation feature described herein, according to at least one example.

FIG. 6 illustrates an example report from a marketplace recommendation and implementation feature described herein, according to at least one example. In accordance with at least one embodiment, the report 600 may be generated by the one or more service provider computers 602 and provided to the user via an email 604. In accordance with at least one embodiment, the report 600 may be generated by the one or more service provider computers 602 and made available for download by a user interacting with a user interface provided by the service. In the current example, the user may interact with the report 600 with a web browser 606 presenting an email service 608. The report 600 can include report information 610 notifying the user that one or more network documents have been generated by the service for implementation into one or more other electronic marketplaces. In accordance with at least one embodiment, the report information 610 can include identified other electronic marketplaces, a rating or score calculated for each identified other electronic marketplace, calculated profit margin by offering items in each identified other electronic marketplace, compliance information for the offered item(s), import/export tax considerations, and whether translations will be required for network documents offering the items in the identified marketplaces.

In accordance with at least one embodiment, the report 600 may present the report information 610 to the user via an instant message, a short message service (SMS) message, or a paraphrased message presented to the user interacting with the electronic marketplace associated with the service. In accordance with at least one embodiment, the report may also include one or more links which notify the service to begin implementing the generated network documents for the user in the identified other electronic marketplaces. The service may also provide one-click buttons which the user may interact with to notify the service to begin implementing the one or more generated network documents in the identified other electronic marketplaces. In accordance with at least one embodiment, the links or buttons that the user can interact with, will take the user to a user interface which will allow the user to provide further input to modify the generated network documents. For example, the user may wish to change the price for the offered one or more items.

Figure 7:
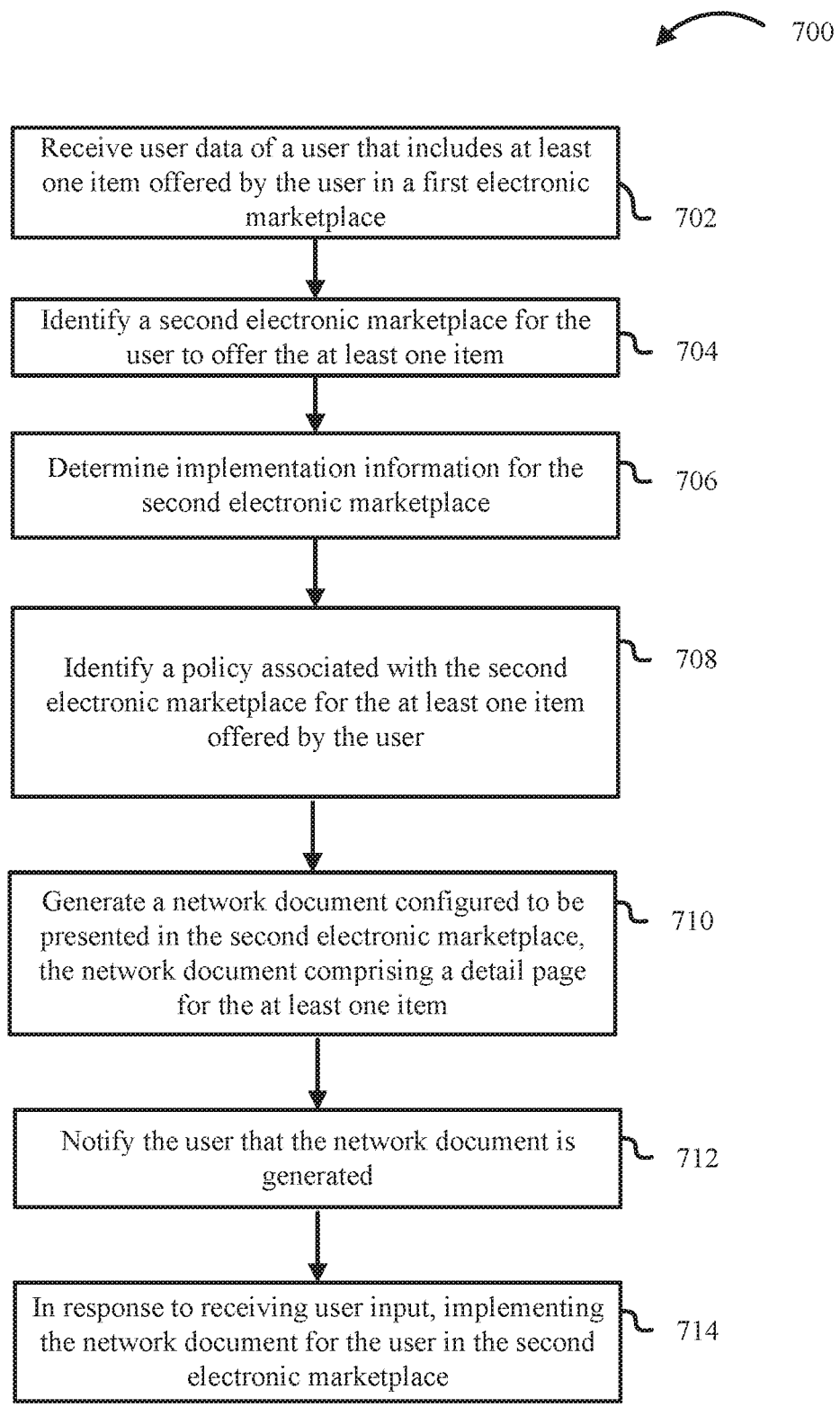
FIG. 7 illustrates an example flow diagram of a process for describing an implementation of a marketplace recommendation and implementation feature described herein, according to at least one example.
Figure 8:
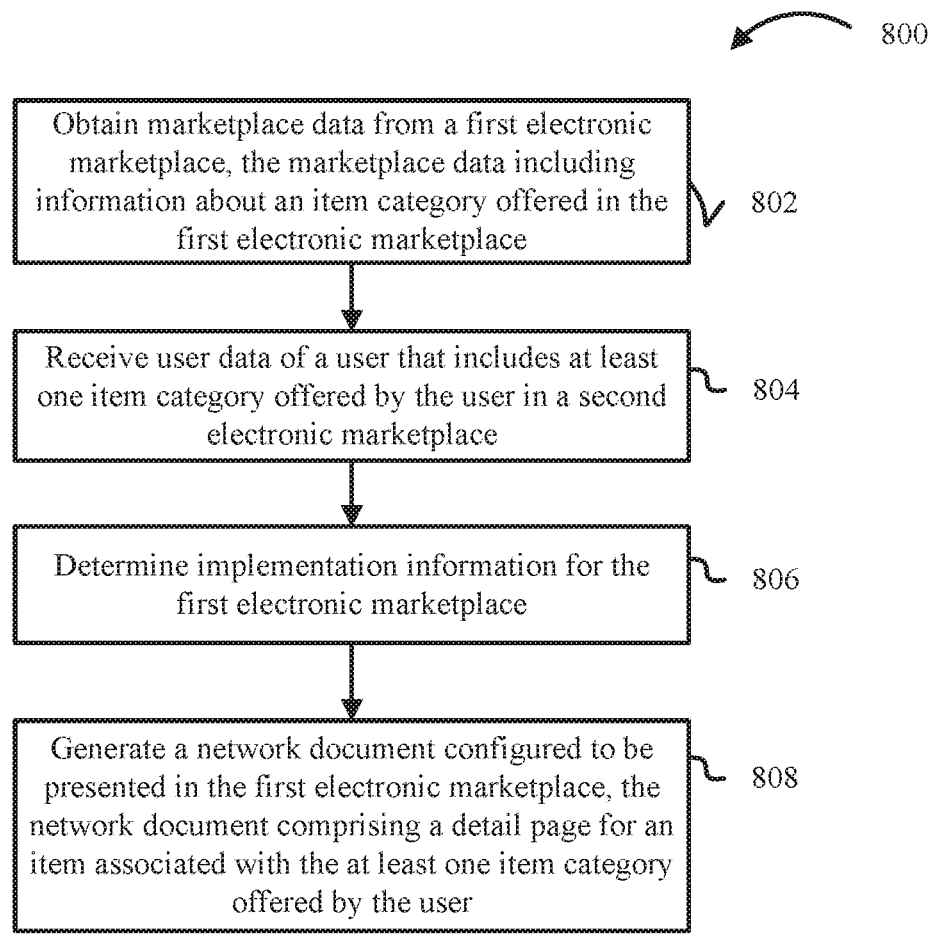
FIG. 8 illustrates an example flow diagram of a process for describing an implementation of a marketplace recommendation and implementation feature described herein, according to at least one example.
Figure 9:
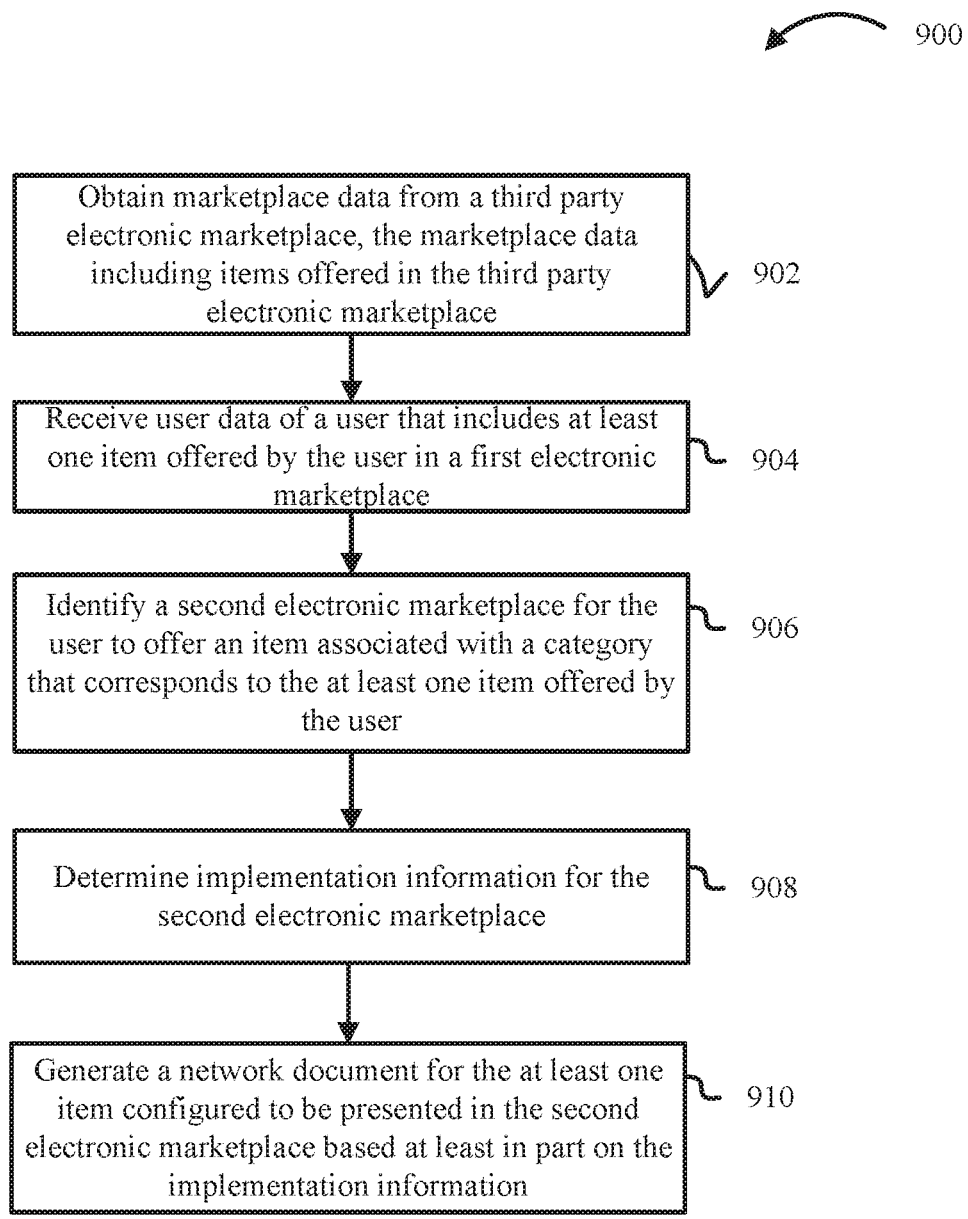
FIG. 9 illustrates an example flow diagram of a process for describing an implementation of a marketplace recommendation and implementation feature described herein, according to at least one example.

FIGS. 7-9 illustrate example flow diagrams showing respective processes 700, 800, and 900 for an implementation of a marketplace recommendation and implementation feature described herein, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 7 illustrates an example flow diagram of a process for describing an implementation of a marketplace recommendation and implementation feature described herein, according to at least one example. In some examples, the one or more service provider computers 410 (e.g., utilizing at least one of the marketplace recommendation module 500, the communication module 502, the potential expansion marketplace item policy module 504, the user interface module 506, the implementation information module 508, the user profile module 512, the network document generation module 514, and the one or more data stores 516) shown in FIG. 5 may perform the process 700 of FIG. 7. The process 700 may begin at 702 by receiving user data of a user that includes at least one item offered by the user in a first electronic marketplace. In accordance with at least one embodiment, the user data may include item data about the at least one item offered by the user. At 704, the process 700 may include identifying a second electronic marketplace for the user to offer the at least one item. In accordance with at least one embodiment, the service may identify the second electronic marketplace based at least in part on the user data. In accordance with at least one embodiment, the service may identify the second electronic marketplace based at least in part on a user profile and associated user profile data maintained by the service.

At 706 the process 700 may include determining implementation information for the second electronic marketplace. In accordance with at least one embodiment, the service may determine the implementation information with a machine learning algorithm utilizing the user data and item data associated with the at least one item. At 708 the process 700 may include identifying a policy associated with the second electronic marketplace for the at least one item offered by the user. In accordance with at least one embodiment, the service may identify a set of policies associated with the second electronic marketplace for the at least one item offered by the user. In accordance with at least one embodiment, the service may store and maintain a policy or a set of policies associated with other electronic marketplaces for one or more items in a catalog maintained by an electronic marketplace associated with the service. At 710 the process 700 may include generating a network document configured to be presented in the second electronic marketplace where the network document can comprise a detail page for the at least one item. In accordance with at least one embodiment, the service may generate a network document based at least in part on the implementation information and the policy. In accordance with at least one embodiment, the service may generate a plurality of network documents for variations of the at least one item or for more than one item based on received user data.

At 712 the process 700 may include notifying the user that the network document is generated. In accordance with at least one embodiment, the service may notify the user via an email, a report, a nudge or indication of a one-click button implementation while the user is interacting with an electronic marketplace associated with the service. The process 700 may conclude at 714 by implementing the network document for the user in the second electronic marketplace in response to receiving user input. In accordance with at least one embodiment, the service may receive user input via a user interface presented to the user while the user interacts with the electronic marketplace associated with the service. In accordance with at least one embodiment, the user may provide user input by clicking on links included in an email sent to the user on behalf of the service notifying the user that the network document is generated. In accordance with at least one embodiment, the communication module 502, the user interface module 506 and the network document generation module 514 may be configured to implement the network document in the second electronic marketplace on behalf of the user for the at least one item. In accordance with at least one embodiment, the service may implement one or more network documents on behalf of the user in one or more identified other electronic marketplaces.

FIG. 8 illustrates an example flow diagram of a process for describing an implementation of a marketplace recommendation and implementation feature described herein, according to at least one example. In some examples, the one or more service provider computers 410 (e.g., utilizing at least one of the marketplace recommendation module 500, the communication module 502, the item category association module 510, the user interface module 506, the implementation information module 508, the user profile module 512, the network document generation module 514, and the one or more data stores 516) shown in FIG. 5 may perform the process 800 of FIG. 8. The process 800 may begin at 802 by obtaining marketplace data from a first electronic marketplace, the marketplace data including information about item categories offered in the first electronic marketplace. In accordance with at least one embodiment, the marketplace data may include information about one or more item categories offered in the first electronic marketplace. In accordance with at least one embodiment, the marketplace data can include social networking trend data, or the social networking trend data can be obtained/received from a separate third party entity.

At 804 the process 800 may include receiving user data of a user that includes at least one item category offered by the user in a second electronic marketplace. In accordance with at least one embodiment, the service may receive one or more item categories offered by the user in a second electronic marketplace from the user data. In accordance with at least one embodiment, the service may receive user data directly from the user, where the user indicates that they wish to offer items in particular categories in other electronic marketplaces. At 806 the process 800 may include determining implementation information for the first electronic marketplace. In accordance with at least one embodiment, the service may determine the implementation information based on the marketplace data and the user data. In accordance with at least one embodiment, the service may analyze the item categories included in the marketplace data and user data to determine if implementation information should be generated for the first electronic marketplace. For example, if the service determines that the user currently does not offer any items in a category similar to item categories offered in the first electronic marketplace, the service may not determine implementation information or generate a network document for the first electronic marketplace. The process 800 may conclude at 808 by generating a network document configured to be presented in the first electronic marketplace, the network document comprising a detail page for an item associated with the at least one item category offered by the user. In accordance with at least one embodiment, the network document may be generated based on the implementation information. In accordance with at least one embodiment, the service may generate a plurality of network documents corresponding to multiple items included in an item category offered by the user.

FIG. 9 illustrates an example flow diagram of a process for describing an implementation of a marketplace recommendation and implementation feature described herein, according to at least one example. In some examples, the one or more service provider computers 410 (e.g., utilizing at least one of the marketplace recommendation module 500, the communication module 502, the user interface module 506, the implementation information module 508, the user profile module 512, the network document generation module 514, and the one or more data stores 516) shown in FIG. 5 may perform the process 900 of FIG. 9. The process 900 may begin at 902 by obtaining marketplace data from a third party electronic marketplace, the marketplace data including items offered in the third party electronic marketplace. In accordance with at least one embodiment, the service may also obtain social networking trend data from a social networking site. In accordance with at least one embodiment, a third party electronic marketplace may include a social networking site. At 904 the process 900 may include receiving user data of a user that includes at least one item offered by the user in a first electronic marketplace. In accordance with at least one embodiment, the user data may include item data about the at least one item offered by the user.

At 906 the process 900 may include identifying a second electronic marketplace for the user to offer an item associated with a category that corresponds to the at least one item offered by the user. In accordance with at least one embodiment, the service may identify the second electronic marketplace based at least in part on the user data and the marketplace data. At 908 the process 900 may include determining implementation information for the second electronic marketplace. In accordance with at least one embodiment, the service may determine the implementation information based at least in part on the marketplace data and the item data associated with the at least one item. In accordance with at least one embodiment, the service may determine the implementation information based at least in part on social networking trend data and the item data associated with the at least one item. The process 900 may conclude at 910 by generating a network document for the at least one item configured to be presented in the second electronic marketplace. In accordance with at least one embodiment, the service may generate the network document based at least in part on the implementation information. In accordance with at least one embodiment, the service may generate one or more network documents based at least in part on the implementation information for one or more items. In accordance with at least one embodiment, the service may notify the user that one or more network documents have been generated and are ready to be implemented in identified marketplaces.

Figure 10:
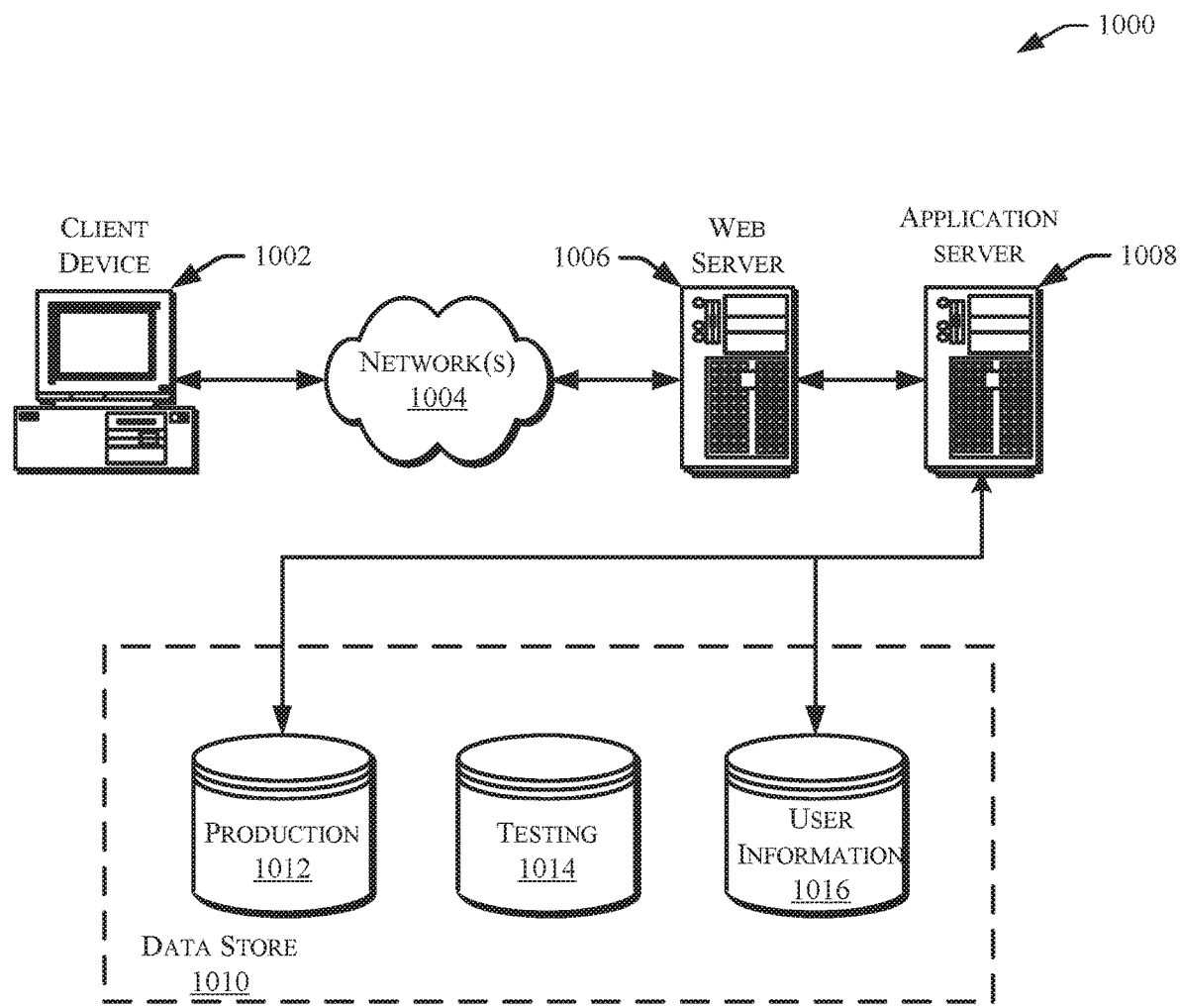
FIG. 10 illustrates an environment in which various embodiments of a marketplace recommendation and implementation feature described herein can be implemented, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   memory including computer-executable instructions that, when executed by the at least one processor, cause the system to at least:
   identify a first electronic marketplace in which a user offers one or more items for sale;
   identify one or more other electronic marketplaces in which the user does not offer items for sale;
   obtain marketplace data from the one or more other electronic marketplaces, the marketplace data including information about a first item category offered in the one or more other electronic marketplaces;
   receive user data of the user that includes at least one second item category offered by the user in the first electronic marketplace and is associated with the first item category offered in the one or more electronic marketplaces;
   calculate a score for each of the one or more other electronic marketplaces based at least in part on a machine learning algorithm utilizing the user data and item information for items offered in each of the one or more other electronic marketplaces, the item information identifying profit margins for the items and units sold for the items in each of the one or more other electronic marketplaces, wherein higher scores are assigned based on the profit margins when the user is most interested in increased profit margins and higher scores are assigned based on the units sold when the user is most interested in moving the most units;
   select one or more electronic marketplaces from the one or more other electronic marketplaces based on the calculated score;
   determine, based at least in part on the machine learning algorithm utilizing the user data, the item information, the score for each of the one or more other electronic marketplaces, and the marketplace data, implementation information to offer the at least one second item category in the one or more electronic marketplaces; and
   generate network documents to be presented in each of the one or more electronic marketplaces based at least in part on the implementation information and independent of input from the user, wherein each of the network documents comprises a detail page for an item associated with the at least one second item category offered by the user.

2. The system of claim 1, further comprising:
   notify the user that the network documents are generated; and
   at least in response to receiving user input, provide the network documents for presentation in each of the one or more electronic marketplaces.

3. The system of claim 1, wherein the implementation information to offer the at least one second item category in the one or more electronic marketplaces is determined based at least in part on variations of the items associated with the at least one second item category offered by the user.

4. The system of claim 1, wherein the network documents are generated based at least in part on variations of the items associated with the at least one second item category offered by the user.

5. The system of claim 1, further comprising:
   obtain social network trend data from a social network, wherein determining the implementation information is further based at least in part on the social network trend data.

6. A computer-readable storage medium storing computer-executable instructions that, when executed by a computer system, configure the computer system to perform operations comprising:
   identifying a first electronic marketplace in which a user offers one or more items for sale;
   identifying one or more other electronic marketplaces in which the user does not offer items for sale;
   obtaining marketplace data from the one or more other electronic marketplaces, the marketplace data including information about a first item category offered in the one or more other electronic marketplaces;
   receiving user data of the user that includes at least one second item category offered by the user in the first electronic marketplace and is associated with the first item category offered in the one or more electronic marketplaces;

calculating a score for each of the one or more other electronic marketplaces based at least in part on a machine learning algorithm utilizing the user data and item information for items offered in each of the one or more other electronic marketplaces, the item information identifying profit margins for the items and units sold for the items in each of the one or more other electronic marketplaces, wherein higher scores are assigned based on the profit margins when the user is most interested in increased profit margins and higher scores are assigned based on the units sold when the user is most interested in moving the most units;

selecting one or more electronic marketplaces from the one or more other electronic marketplaces based on the calculated score;

determining, based at least in part on the machine learning algorithm utilizing the marketplace data, the user data, the item information, the score for each of the one or more other electronic marketplaces, implementation information to offer the at least one second item category in the one or more electronic marketplaces; and generating network documents to be presented in each of the one or more electronic marketplaces based at least in part on the implementation information and independent of input from the user, wherein each of the network documents comprises a detail page for an item associated with the at least one second item category offered by the user.

7. The computer-readable storage medium of claim 6, further comprising:

notifying the user that the network documents are generated; and at least in response to receiving user input, providing the network documents for presentation in each of the one or more electronic marketplaces.

8. The computer-readable storage medium of claim 6, further comprising:

obtaining social network trend data from a social network;

identifying, based at least in part on the social network trend data, the one or more other electronic marketplaces; and determining, based at least in part on the social network trend data, the implementation information to offer the at least one second item category in the one or more electronic marketplaces.

9. The computer-readable storage medium of claim 8, wherein the social network trend data includes at least keyword analysis information, geographic location information, and impression metrics from advertisements displayed on the social network.

10. The computer-readable storage medium of claim 6, further comprising:

utilizing user input to identify a potential electronic marketplace; and determining the implementation information for the potential electronic marketplace based at least in part on the user input provided by the user.

11. A computer-implemented method, comprising:

identifying electronic marketplace in which a user offers one or more items for sale;

identifying one or more other electronic marketplaces in which the user does not offer items for sale;

obtaining marketplace data from the one or more other electronic marketplace, the marketplace data including information about a first item category offered in the one or more other electronic marketplaces;

receiving user data of the user that includes at least one second item category offered by the user in the first electronic marketplace and is associated with the first item category offered in the one or more other electronic marketplaces;

calculating a score for each of the one or more other electronic marketplaces based at least in part on a machine learning algorithm utilizing the user data and item information for items offered in each of the one or more other electronic marketplaces, the item information identifying profit margins for the items and units sold for the items in each of the one or more other electronic marketplaces, wherein higher scores are assigned based on the profit margins when the user is most interested in increased profit margins and higher scores are assigned based on the units sold when the user is most interested in moving the most units;

selecting one or more electronic marketplaces from the one or more other electronic marketplaces based on the calculated score;

determining, based at least in part on the machine learning algorithm utilizing the user data, the item information, the score for each of the one or more other electronic marketplaces, and the marketplace data, implementation information to offer the at least one second item category in the one or more electronic marketplaces; and generating network documents to be presented in each of the one or more electronic marketplaces based at least in part on the implementation information and independent of input from the user, wherein each of the network documents comprises a detail page for an item associated with the at least one second item category offered by the user.

12. The computer-implemented method of claim 11, further comprising:

notifying the user that the network documents are generated; and at least in response to receiving user input, providing the network documents for presentation in each of the one or more electronic marketplaces.

13. The computer-implemented method of claim 11, wherein the implementation information to offer the at least one second item category in the one or more electronic marketplaces is determined based at least in part on variations of the items associated with the at least one second item category offered by the user.

14. The computer-implemented method of claim 11, wherein the network documents are generated based at least in part on variations of the items associated with the at least one second item category offered by the user.

15. The computer-implemented method of claim 11, further comprising obtaining social network trend data from a social network, wherein determining the implementation information is further based at least in part on the social network trend data.

16. The computer-implemented method of claim 15, wherein the social network trend data includes at least keyword analysis information, geographic location information, or impression metrics from advertisements displayed on the social network.

17. The computer-implemented method of claim 11, wherein determining the implementation information is further based at least in part on obtaining user input from the user.

* * * * *